United States Patent
Tomita et al.

(10) Patent No.: US 9,863,470 B2
(45) Date of Patent: Jan. 9, 2018

(54) MOTION GUIDE APPARATUS AND METHOD FOR MANUFACTURING THE SAME

(71) Applicant: THK CO., LTD., Tokyo (JP)

(72) Inventors: Shigeo Tomita, Tokyo (JP); Junichi Sakai, Tokyo (JP); Nobuyuki Maki, Tokyo (JP); Kaoru Hoshide, Tokyo (JP); Katsunori Yamamura, Tokyo (JP); Muten Iwamoto, Tokyo (JP); Kazuya Horiike, Tokyo (JP); Kenji Narata, Tokyo (JP); Fukuji Nakano, Tokyo (JP); Shigemi Nakamura, Tokyo (JP); Yosuke Irie, Tokyo (JP); Yuki Nakamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/127,606

(22) PCT Filed: Mar. 30, 2015

(86) PCT No.: PCT/JP2015/059856
§ 371 (c)(1),
(2) Date: Sep. 20, 2016

(87) PCT Pub. No.: WO2015/152125
PCT Pub. Date: Oct. 8, 2015

(65) Prior Publication Data
US 2017/0146059 A1    May 25, 2017

(30) Foreign Application Priority Data
Mar. 31, 2014 (JP) .................. 2014-072766
Mar. 30, 2015 (JP) .................. 2015-067867

(51) Int. Cl.
*F16C 29/06* (2006.01)
*F16C 43/04* (2006.01)

(52) U.S. Cl.
CPC ...... *F16C 29/0607* (2013.01); *F16C 29/0609* (2013.01); *F16C 29/0647* (2013.01); *F16C 43/04* (2013.01)

(58) Field of Classification Search
CPC .. F16C 29/06; F16C 29/0604; F16C 29/0607; F16C 29/0609; F16C 29/0611;
(Continued)

(56) References Cited

U.S. PATENT DOCUMENTS 5,092,685 A * 3/1992 Tonogai ............ F16C 29/0607
384/15
5,102,235 A * 4/1992 Mugglestone ...... F16C 29/0609
384/43

(Continued)

FOREIGN PATENT DOCUMENTS

DE     103 56 854 A1    7/2005
DE  10 2007 056 860 A1    5/2009
(Continued)

OTHER PUBLICATIONS

International Search Report dated Jun. 30, 2015, issued in counterpart international application No. PCT/JP2015/059856 (2 pages).
(Continued)

*Primary Examiner* — Phillip A Johnson
(74) *Attorney, Agent, or Firm* — Westerman, Hattori, Daniels & Adrian

(57) ABSTRACT

An object is to provide a motion guide apparatus that can facilitate an assembly operation. An end member (4a, 4b) including an inner peripheral side of a direction changing path (2c) is placed on an end surface in a movement direction of a moving member body (3). At least one of a
(Continued)

pair of the end members (4a and 4b) includes an opening (21) linking to the inner peripheral side of the direction changing path (2c) to load rolling elements (42) into a circulation path. Opposing surfaces (18) of the pair of the end members (4a and 4b) to the moving member body (3) are formed in flat surfaces. The pair of the end members (4a and 4b) molded integrally with a holding portion (5) is incorporated into the moving member body (3) in a direction orthogonal to the movement direction of the moving member body (3). A lid member (7a, 7b) closes the opening (21) in the end member (4a, 4b).

11 Claims, 14 Drawing Sheets

(58) Field of Classification Search
CPC .............. F16C 29/0633; F16C 29/0638; F16C 29/0642; F16C 29/0645; F16C 29/0647
See application file for complete search history.

(56) References Cited

U.S. PATENT DOCUMENTS

| | | |
|---|---|---|
| 6,132,093 A | 10/2000 | Michioka et al. |
| 2005/0173195 A1 | 8/2005 | Anita et al. |

FOREIGN PATENT DOCUMENTS

| | | | | |
|---|---|---|---|---|
| EP | 0769627 A1 | * | 4/1997 | ............... B23Q 1/40 |
| JP | 07243443 A | * | 9/1995 | .......... F16C 29/0635 |
| JP | 10-47344 A | | 2/1998 | |
| JP | 11-72119 A | | 3/1999 | |
| JP | 11072119 A | * | 3/1999 | .......... F16C 29/0602 |
| JP | 3108833 B2 | | 11/2000 | |
| JP | 3108833 U | | 11/2000 | |
| JP | 2002276656 A | * | 9/2002 | .......... F16C 29/0602 |
| JP | 2004036787 A | * | 2/2004 | .............. F16C 29/06 |
| JP | 2004-132494 A | | 4/2004 | |
| JP | 2004-205014 A | | 7/2004 | |
| JP | 2005-127474 A | | 5/2005 | |
| JP | 2005-207469 A | | 8/2005 | |
| TW | 200521345 A | | 7/2005 | |

OTHER PUBLICATIONS

Office Action dated Jun. 14, 2016, of counterpart Japanese Application No. 2015-067867 (W/English Translation) (7 pages).
Office Action dated Jun. 9, 2016, of counterpart Japanese Application No. 2015-067867 (W/English Translation) (7 pages).
Office Action dated May 31, 2017, issued in counterpart Chinese Patent Application No. 201580017632.1, with English translation. (8 pages).

* cited by examiner

MOTION GUIDE APPARATUS AND METHOD FOR MANUFACTURING THE SAME

TECHNICAL FIELD

The present invention relates to a motion guide apparatus including a track member and a moving member assembled in a movable manner to the track member via rolling elements, and a method for manufacturing the motion guide apparatus.

BACKGROUND ART

A motion guide apparatus that guides the linear motion of a mobile body such as a table using the rolling motion of rolling elements is known. The motion guide apparatus is also called a linear guide, and includes a track rail, and a moving block assembled in a movable manner to the track rail via rolling elements. A rolling element rolling portion where the rolling elements can make a rolling motion is formed along a longitudinal direction in the track rail. A circulation path for circulating the rolling elements is formed in the moving member. The circulation path includes a loaded rolling element rolling portion facing the rolling element rolling portion of the track rail, a return path parallel to the loaded rolling element rolling portion, and a pair of U-shaped direction changing paths linking one end and the other end of the return path.

A typical motion guide apparatus is formed by assembling end caps to both end surfaces in a movement direction of a moving block body. The moving block body includes a central portion facing an upper surface of the track rail, and a pair of sleeve portions facing side surfaces of the track rail, and is formed in an angular U shape. The loaded rolling element rolling portion of the circulation path is formed on an inner side surface of the sleeve portion of the moving block body. An inner peripheral side of the direction changing path is formed into a semi-cylindrical portion that is also called an R piece. An outer peripheral side of the direction changing path is formed in the end cap. After the R piece is incorporated into the end cap, the end cap is attached to the end surface in the movement direction of the moving member body to form the circulation path.

When the rolling elements are loaded into the circulation path, the rolling elements are loaded from an inner side surface of the angular U-shaped moving block body. However, the rolling element loading operation is an operation in a small space; therefore, there is a problem that it takes time and trouble. In order to solve this problem, an invention has been proposed in which an end cap is provided with an opening to insert rolling elements from the opening toward a longitudinal direction of a track rail (see Patent Literature 1). After the rolling elements are loaded into a circulation path, the opening is closed with a closing member. According to this invention, the rolling elements can be loaded using a large space in a longitudinal direction of a track rail; accordingly, the loading operation is facilitated. A motion guide apparatus especially suitable for automatic loading of rolling elements by an automatic machine can be obtained.

CITATION LIST

Patent Literature

Patent Literature 1: JP 2004-205014 A

SUMMARY OF INVENTION

Technical Problem

However, there is a problem with the invention described in Patent Literature 1 that an operation of assembling the circulation path before loading the rolling elements into the circulation path takes time and trouble. Moreover, the closing member that closes the opening in the end cap is required. Accordingly, there is also a problem that the number of parts is increased.

An object of the present invention is to provide a motion guide apparatus that can facilitate an assembly operation and a method for manufacturing the motion guide apparatus.

Solution to Problem

In order to solve the problem, a first aspect of the present invention is a motion guide apparatus including: a track member including a rolling element rolling portion; a moving member body including a loaded rolling element rolling portion facing the rolling element rolling portion, and a return path parallel to the loaded rolling element rolling portion; a plurality of rolling elements placed in a manner capable of rolling motion between the rolling element rolling portion of the track member and the loaded rolling element rolling portion of the moving member body; end members placed on end surfaces in a movement direction of the moving member body, the end members each including an inner peripheral side of a direction changing path linking the loaded rolling element rolling portion to the return path; a lid member including an outer peripheral side of the direction changing path; and a holding portion for preventing the rolling elements from dropping off the loaded rolling element rolling portion of the moving member body upon the removal of the moving member body from the track member, wherein at least one of a pair of the end members includes an opening, linking to the direction changing path, for loading the rolling elements into a circulation path including the loaded rolling element rolling portion, the direction changing path, and the return path, opposing surfaces of the pair of the end members to the moving member body are formed in flat surfaces, the pair of the end members molded integrally with the holding portion are incorporated into the moving member body in a direction orthogonal to the movement direction of the moving member body, and the lid member closes the opening of the end member.

A second aspect of the present invention is a motion guide apparatus including: a track member including a rolling element rolling portion; a moving member body including a loaded rolling element rolling portion facing the rolling element rolling portion, and a return path parallel to the loaded rolling element rolling portion; a plurality of rolling elements placed in a manner capable of rolling motion between the rolling element rolling portion of the track member and the loaded rolling element rolling portion of the moving member body; an end member placed on an end surface in a movement direction of the moving member body; and a lid member including an outer peripheral side of a direction changing path linking the loaded rolling element rolling portion to the return path, wherein the end member is formed integrally with an inner peripheral side of the direction changing path and/or a holding portion for preventing the rolling elements from dropping off the loaded rolling element rolling portion of the moving member body upon the removal of the moving member body from the track member, the lid member includes a boss, the end member includes a fitting hole into which the boss is fitted, and the moving member body includes a boss hole into which the boss is fitted.

Advantageous Effects of Invention

According to the first aspect of the present invention, the pair of the end members is molded integrally with both ends of the holding portion, and the component is incorporated into the moving member body in the direction orthogonal to the movement direction of the moving member body. Accordingly, the positions of the pair of the end members can be determined in the movement direction of the moving member body, and an operation of assembling the circulation path is facilitated.

According to the second aspect of the present invention, the positions of the moving member body, the lid member, and the end member can be collectively determined at the position of the boss of the lid member. Accordingly, the influence of a dimensional deviation of each component can be reduced, and ease of assembly of the motion guide apparatus and sliding performance (that is, the smooth movement of the rolling elements) are improved.

DESCRIPTION OF EMBODIMENTS

Figure 1:
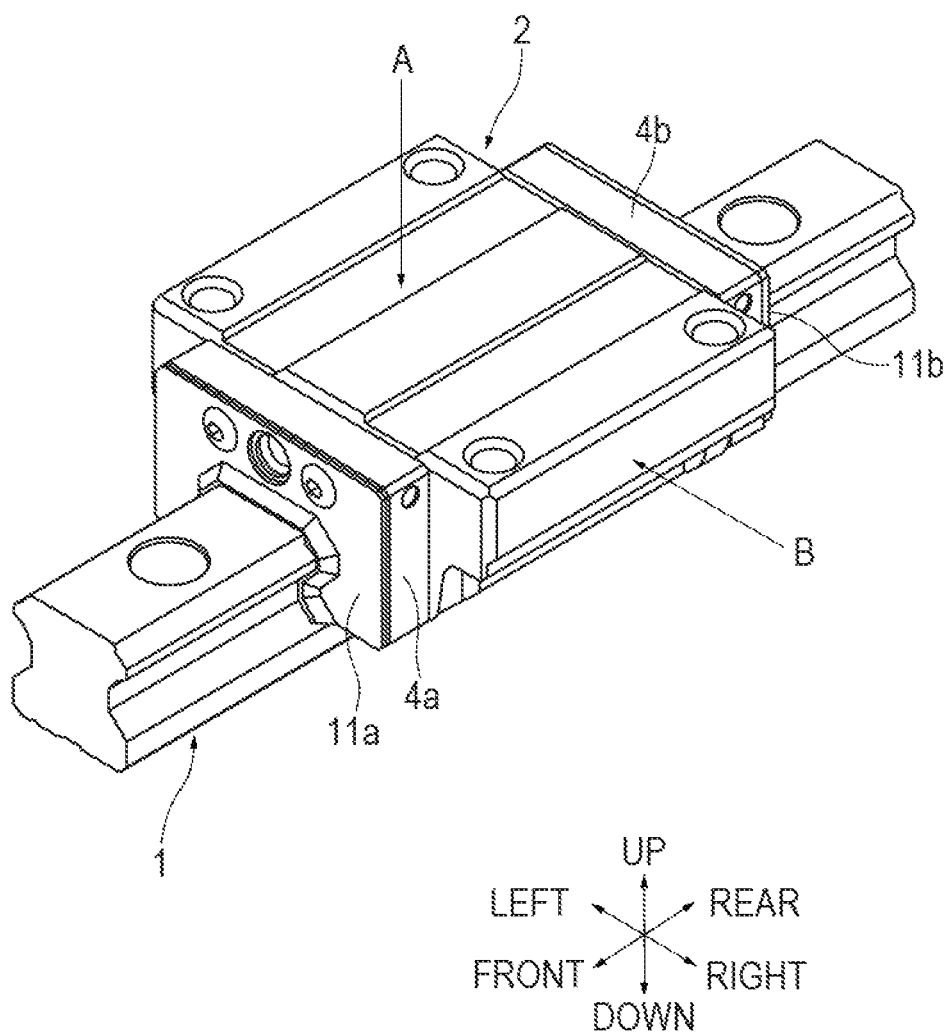
FIG. 1 is an external perspective view of a motion guide apparatus according to a first embodiment of the present invention.

A motion guide apparatus according to one embodiment of the present invention is described in detail hereinafter with reference to the accompanying drawings. FIG. 1 illustrates a perspective view of the motion guide apparatus according to the embodiment. The motion guide apparatus includes a track rail 1 as a track member, and a moving block 2 as a moving member slidably assembled to the track rail 1. Multiple balls are disposed as rolling elements in a manner capable of rolling motion between the track rail 1 and the moving block 2. The track rail 1 is attached to an unillustrated base or the like. The moving block 2 is attached to an unillustrated mobile body such as a table. In the following description, "up and down" indicates up and down with respect to the motion guide apparatus when the track rail 1 is placed on a horizontal plane, and "left and right" indicates left and right with respect to the motion guide apparatus as viewed from a longitudinal direction of the track rail 1 when the track rail 1 is placed on the horizontal plane. In other words, an up and down direction, a front and rear direction, and a left and right direction, which are illustrated in FIG. 1, are used. Naturally, the placement of the motion guide apparatus is not limited to such a placement.

Figure 2:
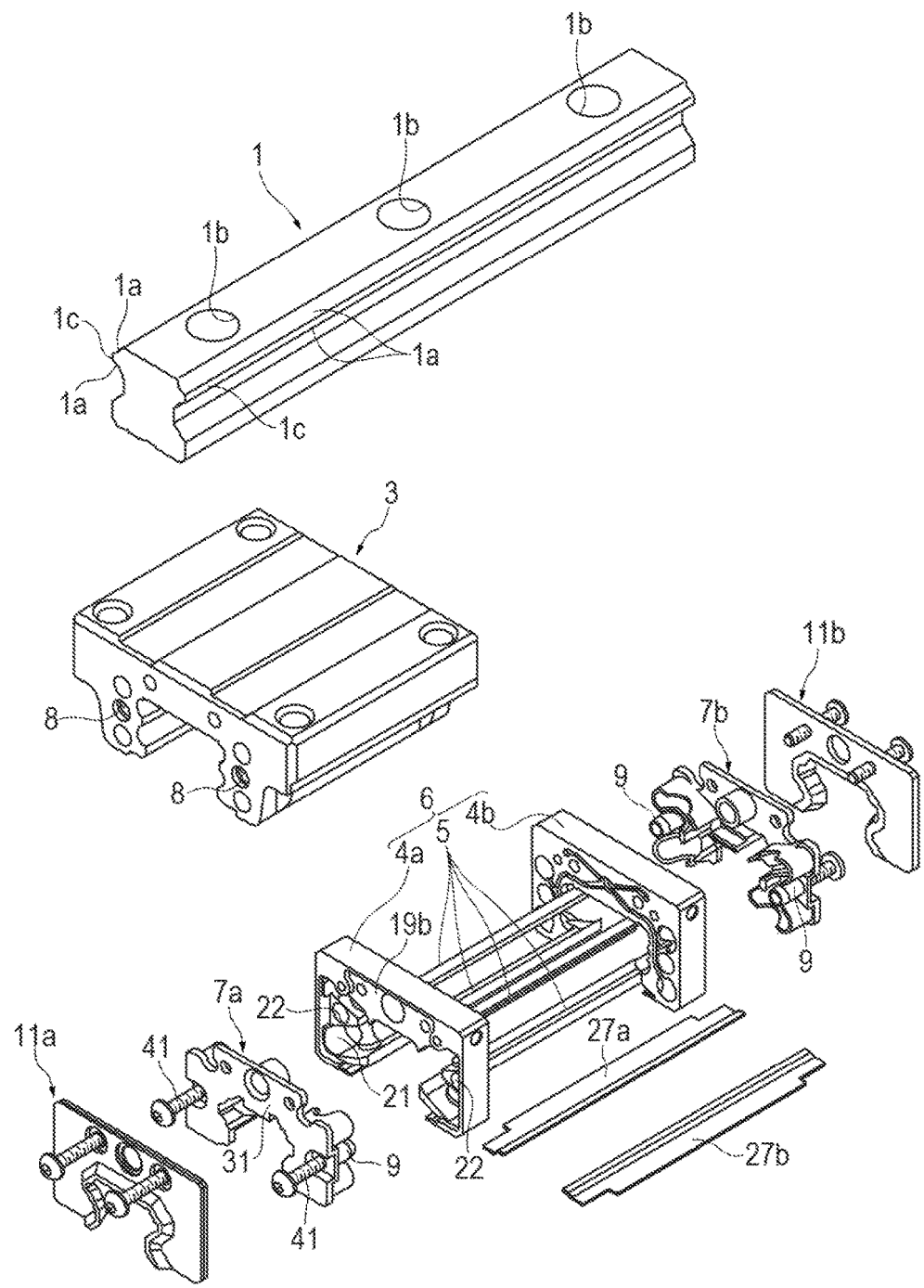
FIG. 2 is an exploded perspective view of the motion guide apparatus according to the first embodiment of the present invention.

FIG. 2 illustrates an exploded perspective view of the motion guide apparatus. Bolt-insertion through holes 1b for attaching the track rail 1 to the base or the like are formed in the longitudinal direction in an upper surface of the track rail 1, spaced at predetermined intervals. A plurality of ball rolling grooves 1a on which the balls make a rolling motion is formed as rolling element rolling portions along the longitudinal direction in side surfaces of the track rail 1. In the embodiment, a pair of left and right protrusions 1c protruding in a width direction is formed in an upper part of the track rail 1. A total of four ball rolling grooves 1a are formed: two above the protrusions 1c and two below the protrusions 1c.

The moving block 2 includes a moving block body 3, a resin component 6 molded integrally with a pair of end plates 4a and 4b placed on both end surfaces in a movement direction of the moving block body 3 (that is, the longitudinal direction of the track rail 1) and holding portions 5, and a pair of lid members 7a and 7b. In the embodiment, only three components, that is, the resin component 6 and the pair of lid members 7a and 7b, are incorporated into the moving block body 3 to form four circulation paths.

Figure 3:
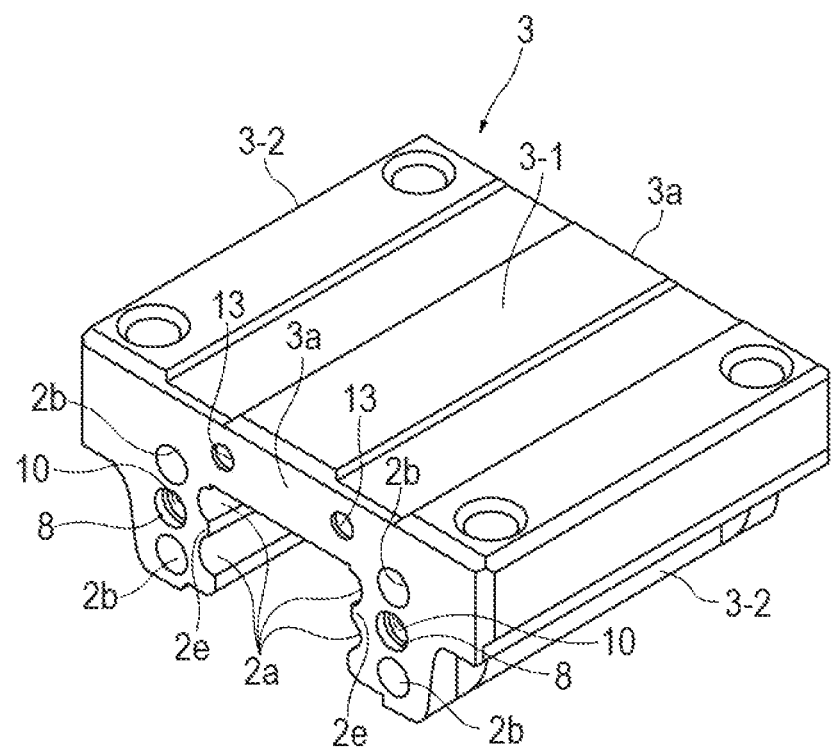
FIG. 3 is a perspective view of a moving block body according to the first embodiment of the present invention.

As illustrated in FIG. 3, the moving block body 3 includes a central portion 3-1 facing the upper surface of the track rail 1, and a pair of sleeve portions 3-2 facing the left and right side surfaces of the track rail 1. The moving block body 3 as a whole is formed into a saddle shape or angular U shape. Four loaded ball rolling grooves 2a facing the ball rolling grooves 1a of the track rail 1 are formed as loaded rolling element rolling portions in inner side surfaces of the sleeve portions 3-2 of the moving block body 3. A total of four return paths 2b are formed parallel to the loaded ball rolling grooves 2a in the moving block body 3. The return path 2b comprises a through hole extending in the movement direction of the moving block body 3.

Both end surfaces 3a in the movement direction of the moving block body 3 are formed in flat surfaces. Boss holes 8 are formed in both end surfaces 3a in the movement direction of the moving block body 3. The boss hole 8 is placed between the upper and lower return paths 2b of the sleeve portion 3-2 of the moving block body 3. The boss holes 8 are fitted to bosses 9 (see FIG. 2) of the lid members 7a and 7b, the bosses 9 functioning as positioning means. A stepped small diameter hole 10 whose inner diameter is smaller than that of the boss hole 8 is formed in the boss hole 8. A thread is processed on an inner peripheral surface of the small diameter hole 10. FIG. 3 illustrates only the boss holes 8 on the front side of the moving block body 3. However, the boss holes 8 are also formed on the rear side of the moving block body 3. Moreover, screw holes 13 for attaching end seals 11a and 11b illustrated in FIG. 2 to the moving block body 3 are processed in both end surfaces 3a in the movement direction of the moving block body 3.

Figure 4:
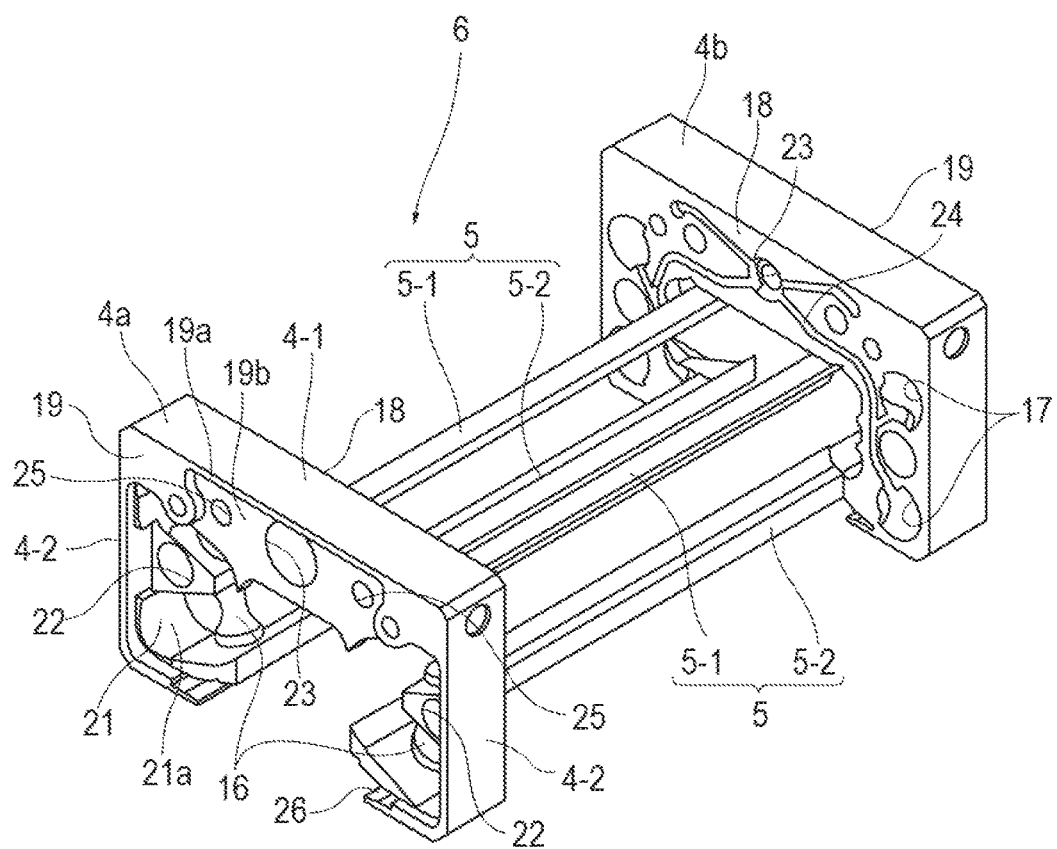
FIG. 4 is a perspective view of a resin component according to the first embodiment of the present invention.

As illustrated in FIG. 4, the resin component 6 is resin molded integrally with the holding portions 5 and the pair of end plates 4a and 4b placed on both end surfaces 3a in the movement direction of the moving block body 3.

The holding portion 5 prevents the balls from dropping off the loaded ball rolling groove 2a when the moving block 2 is removed from the track rail 1. The holding portion 5 includes a slim first holding portion 5-1 along the upper loaded ball rolling groove 2a of the sleeve portion 3-2 of the moving block body 3, and a second holding portion 5-2 along the lower loaded ball rolling groove 2a. The first holding portion 5-1 is placed above the upper loaded ball rolling groove 2a. A protruding ridge 2e (see FIG. 3) is formed between the upper loaded ball rolling groove 2a and the lower loaded ball rolling groove 2a of the moving block body 3. The spacing between the first holding portion 5-1 and the protruding ridge 2e is smaller than the diameter of the ball to prevent the balls from dropping off. Similarly, the second holding portion 5-2 is placed below the lower loaded ball rolling groove 2a. The spacing between the second holding portion 5-2 and the protruding ridge 2e is smaller than the diameter of the ball.

The end plates 4a and 4b each include a central portion 4-1 facing the upper surface of the track rail 1 and a pair of sleeve portions 4-2 facing the left and right side surfaces of the track rail 1. The end plates 4a and 4b are each formed in an angular U shape (that is, a saddle shape) that is fit to a front shape of the moving block body 3. The end plates 4a and 4b include R piece portions 16 each serving as an inner peripheral side of a direction changing path 2c (see FIG. 6) linking the loaded ball rolling groove 2a and the return path 2b of the moving block body 3. The R piece portion 16 has a shape obtained by forming a groove having a cross section of an arc shape with respect to a circumferential direction on a semi-cylindrical surface. A groove on the surface of the R piece portion 16 forms the inner peripheral side of the direction changing path 2c. A communication hole 17 linking to the return path 2b is formed on the return path 2b side of the R piece portion 16.

Opposing surfaces 18 of the end plates 4a and 4b to the moving block body 3 are formed in flat surfaces in such a manner as to enable incorporation of the pair of end plates 4a and 4b molded integrally with the holding portions 5 in a direction orthogonal to the movement direction of the moving block body 3. Flat surface here indicates that there is no positioning-purpose projection protruding toward the moving block body 3, or the like. Flat surface does not indicate the elimination of the possibility of forming, in the opposing surface 18, a recess such as a groove (see FIG. 4) of a lubricating path 24 and a hole 23 (see FIG. 4) for attaching a grease nipple as in the embodiment. A frame portion 19a and a mating recess 19b recessed one level below the frame portion 19a are formed on an end surface 19 of the end plate 4a, 4b in the movement direction. A plate portion 31 (see FIG. 2) of the lid member 7a, 7b, the plate portion 31 being described below, is fitted into the mating recess 19b inside the frame portion 19a. The lid member 7a, 7b is surrounded by the end plate 4a, 4b in such a manner as that only the end plate 4a, 4b is visible in planar view (arrow view A of FIG. 1) and side view (arrow view B of FIG. 1) of the moving block 2.

As illustrated in FIG. 4, openings 21 that each link to the inner peripheral side of the direction changing path 2c to load the balls into the circulation path are formed in the mating recess 19b of the end plate 4a, 4b. The balls are loaded from the openings 21 toward the longitudinal direction of the track rail 1. A wall 21a that prevents the balls from dropping off upon loading of the balls is formed around the opening 21. As viewed from the longitudinal direction of the track rail 1, the wall 21a is not formed on a closed curved surface, and opens to a side closer to the track rail 1. In order to steadily load the balls in a line, a rail jig is incorporated into the moving block 2 upon loading of the balls. A part of the wall 21a of the opening 21 is open; accordingly, interference with the rail jig can be avoided. The number of the openings 21 is the same as that of the direction changing paths 2c, and is four in the embodiment.

A fitting hole 22 into which the boss 9 of the lid member 7a, 7b is fitted is formed between the upper and lower R piece portions 16 of the sleeve portion 4-2 of the end plate 4a, 4b. The fitting hole 22 serves as a reference for positioning between the end plate 4a, 4b and the lid member 7a, 7b. As illustrated in FIG. 2, the plate portion 31 of the lid member 7a, 7b is fitted into the mating recess 19b of the end plate 4a, 4b. In order to enable the determination of the positions of the end plate 4a, 4b and the lid member 7a, 7b not by the mating recess 19b and the plate portion 31 but by the fitting holes 22 and the bosses 9, a tolerance between the fitting hole 22 and the boss 9 is set more strictly than a tolerance between the plate portion 31 and the mating recess 19b.

The hole 23 for attaching a grease nipple is open in the end plate 4a, 4b. The lubricating path 24 reaching the communication holes 17 from the hole 23 is formed in the opposing surface 18 of the end plate 4a, 4b to the moving block body 3. Through holes 25 for attaching, to the moving block body 3, the end seal 11a, 11b (see FIG. 2) that prevents foreign substances from entering the inside of the moving block 2 are open on the right and left of the hole 23. An insertion groove 26 for attaching a side seal 27a, 27b (see FIG. 2) that prevents foreign substances from entering the inside of the moving block 2 is formed at a lower end of the sleeve portion 4-2 of the end plate 4a, 4b.

Figure 5A:
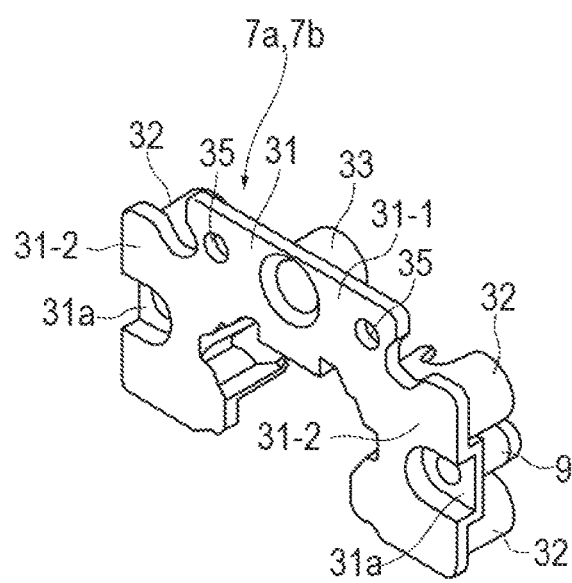
FIGS. 5A and 5B are perspective views of a lid member according to the first embodiment of the present invention (FIG. 5A illustrates a frontal perspective view, and FIG. 5B illustrates a rear perspective view).
Figure 5B:
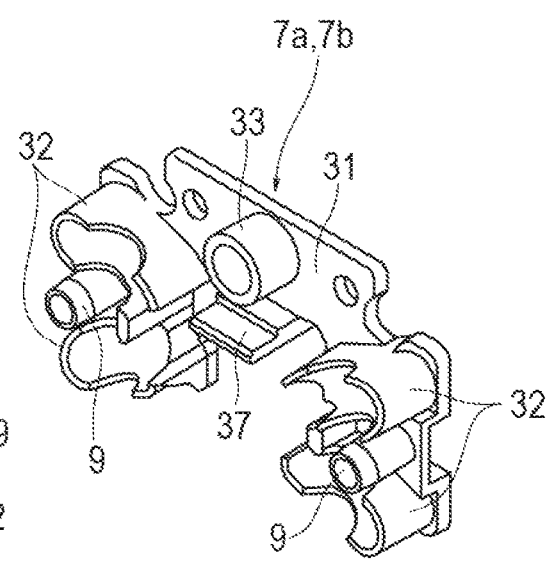

FIG. 5A illustrates a frontal perspective view of the lid member 7a, 7b. FIG. 5B illustrates a rear perspective view of the lid member 7a, 7b. The lid member 7a, 7b includes the thin plate-shaped plate portion 31, and direction changing path forming portions 32 protruding from the plate portion 31 toward the end plate 4a, 4b. The plate portion 31 includes a central portion 31-1 facing the upper surface of the track rail 1, and a pair of sleeve portions 31-2 facing the side surfaces of the track rail 1. The direction changing path forming portions 32 are provided to upper and lower parts of the sleeve portion 31-2. An outer peripheral side of the direction changing path 2c (see FIG. 6) is formed in the direction changing path forming portion 32. The direction changing path forming portion 32 is concave-convex fitted to the R piece portion 16 of the end plate 4a, 4b, and forms the U-shaped direction changing path 2c in cooperation with the R piece portion 16. The cylindrical bosses 9 are formed between the upper and lower direction changing path forming portions 32 of the plate portion 31, protruding toward the end plate 4a, 4b. A through hole through which a screw 41 (see FIG. 2) as a fastening member is passed is formed in the boss 9. Recesses 31a in which the heads of the screws 41 are seated are formed in the plate portion 31 to prevent the head portions of the screws 41 from protruding from the plate portion 31.

The plate portion 31 of the lid member 7a, 7b is provided with a cylindrical protrusion 33 for attaching a grease nipple. The cylindrical protrusion 33 is fitted into the hole 23 (see FIG. 4) of the end plate 4a, 4b. Through holes 35 for attaching the end seal 11a, 11b illustrated in FIG. 2 to the moving block body 3 are open on the left and right of the cylindrical protrusion 33. A receiving portion 37 (see FIG. 5B) for inner sealing that prevents foreign substances from entering the inside of the moving block 2 is formed at a lower end of the plate portion 31.

Figure 6:
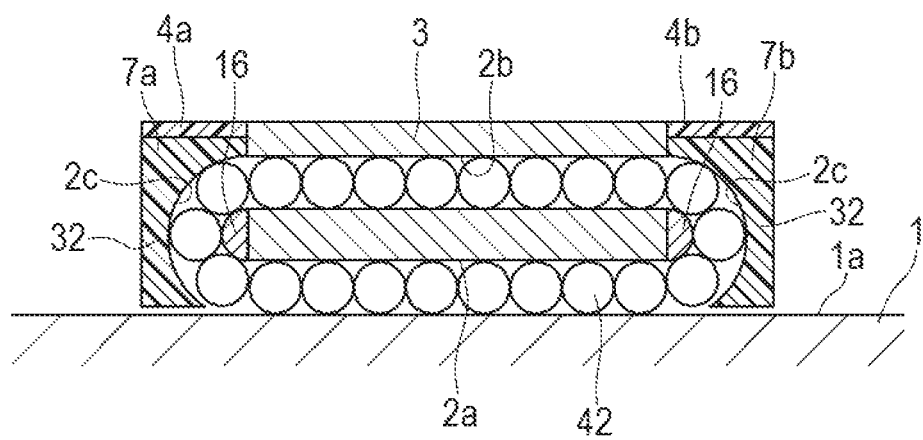
FIG. 6 is a cross-sectional view taken along a circulation path of balls according to the first embodiment of the present invention.

FIG. 6 illustrates the circulation path of the moving block 2. The circulation path includes the loaded ball rolling groove 2a, the return path 2b parallel to the loaded ball rolling groove 2a, and the U-shaped direction changing paths 2c linking the loaded ball rolling groove 2a to the return path 2b. The inner peripheral side of the direction changing path 2c is formed by the R piece portion 16 of the end plate 4a, 4b. The outer peripheral side of the direction changing path 2c is formed by the direction changing path forming portion 32 of the lid member 7a, 7b.

Figure 7A:
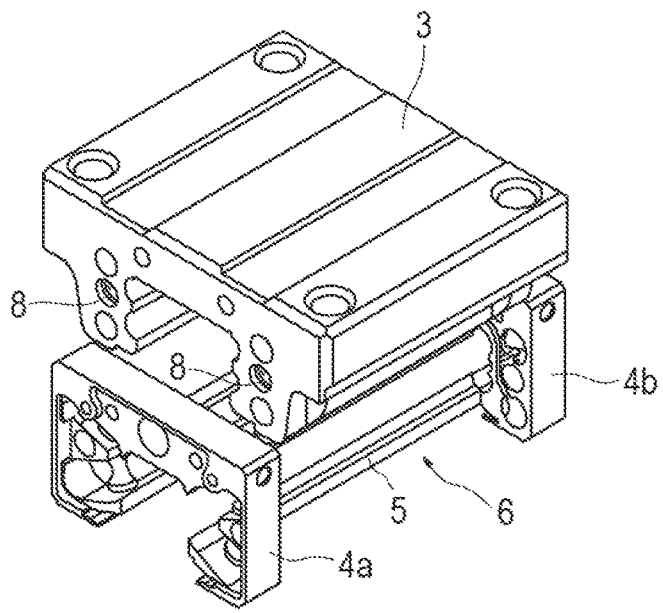
FIGS. 7A to 7C are manufacturing process diagrams of the motion guide apparatus according to the first embodiment of the present invention (FIG. 7A illustrates a state before the resin component is incorporated into the moving block body, FIG. 7B illustrates a state after the resin component is incorporated into the moving block body, and FIG. 7C illustrates a state where the lid member is fitted into the resin component).
Figure 7B:
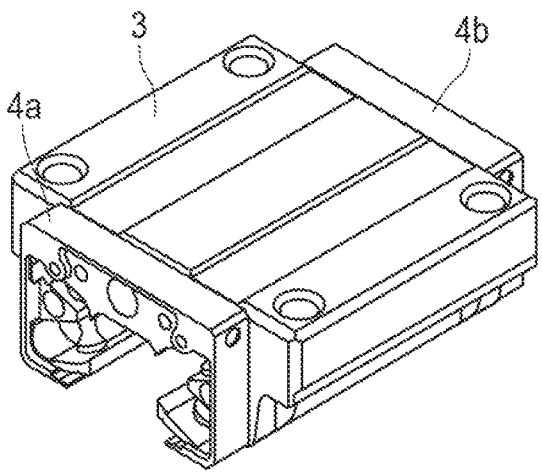

A method for assembling the motion guide apparatus according to the embodiment is described hereinafter with reference to FIGS. 7A to 9. Firstly, as illustrated in FIG. 7A, the resin component 6 obtained by molding the pair of end plates 4a and 4b with the holding portions 5 is prepared. Next, the resin component 6 is assembled to the moving block body 3 from below the moving block 2. After the resin component 6 is assembled to the moving block body 3, the pair of end plates 4a and 4b sandwich both end surfaces in the movement direction of the moving block body 3 as illustrated in FIG. 7B. Accordingly, the positions of the pair of end plates 4a and 4b are determined in the movement direction of the moving block body 3.

Figure 7C:
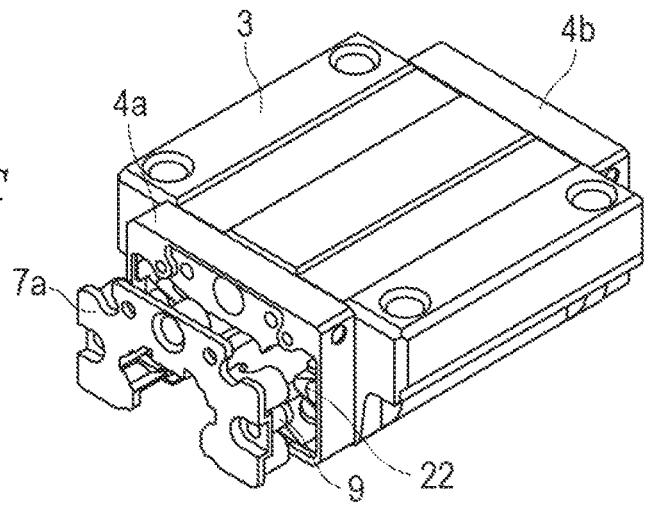
Figure 8D:
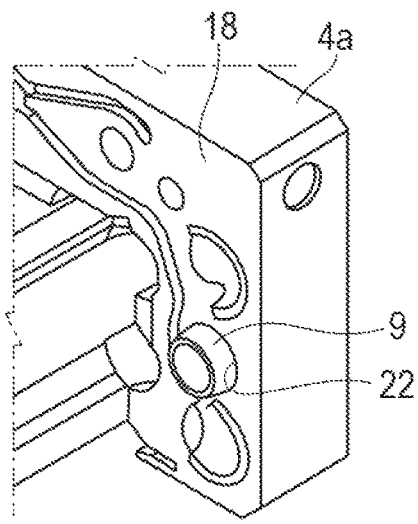
FIGS. 8D to 8F are manufacturing process diagrams of the motion guide apparatus according to the first embodiment of the present invention (FIG. 8D illustrates a boss of the lid member, the boss protruding from the resin component, the boss protruding from the resin component, FIG. 8E illustrates a state where screws are passed through the lid member, and FIG. 8F illustrates a state where the screws are tightened on the moving block body).

Next, as illustrated in FIG. 7C, the lid member 7a is fitted into one end plate 4a in the movement direction of the moving block body 3. As illustrated in FIG. 8D, the bosses 9 of the lid member 7a are then fitted into the fitting holes 22 in the end plate 4a. The bosses 9 of the lid member 7a protrude from the opposing surface 18, which faces the moving block body 3, of the end plate 4a. The protruding bosses 9 are fitted into the boss holes 8 (see FIG. 7A) of the moving block body 3. Hence, the position of the resin component 6 can be determined in the direction orthogonal to the movement direction of the moving block body 3. At the same time, the resin component 6 can also be temporarily fixed to the moving block body 3. In the state illustrated in FIG. 7B, the position of the resin component 6 is not determined in the direction orthogonal to the movement direction of the moving block body 3. The position of the resin component 6 can be determined only after the lid member 7a is fitted into the end plate 4a in the movement direction of the moving block body 3.

Figure 8E:
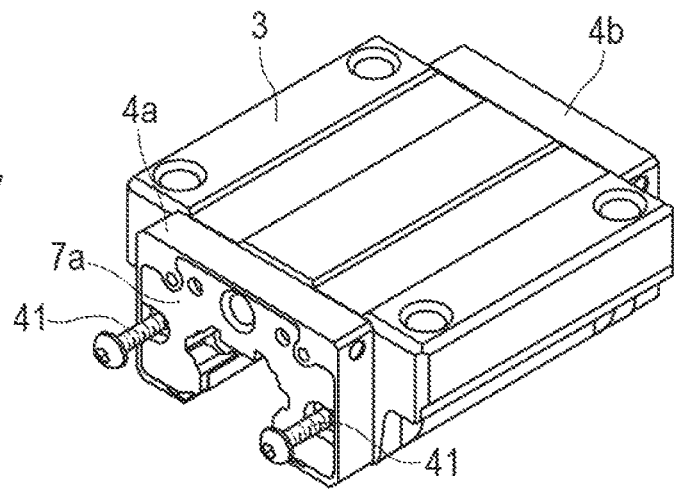
Figure 8F:
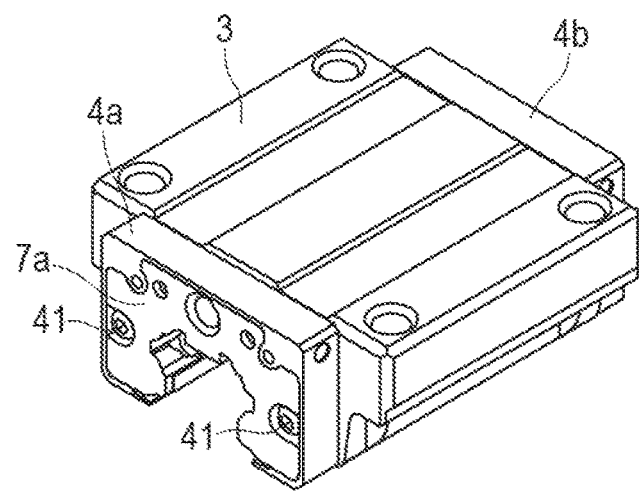

Next, as illustrated in FIG. 8E, the screws 41 are passed through the through holes of the bosses 9 of the lid member 7a to tighten the screws 41 on the moving block body 3. As illustrated in FIG. 8F, the lid member 7a is fixed to the moving block body 3. The end plate 4a sandwiched between the lid member 7a and the moving block body 3 is also fixed to the moving block body 3.

Figure 9:
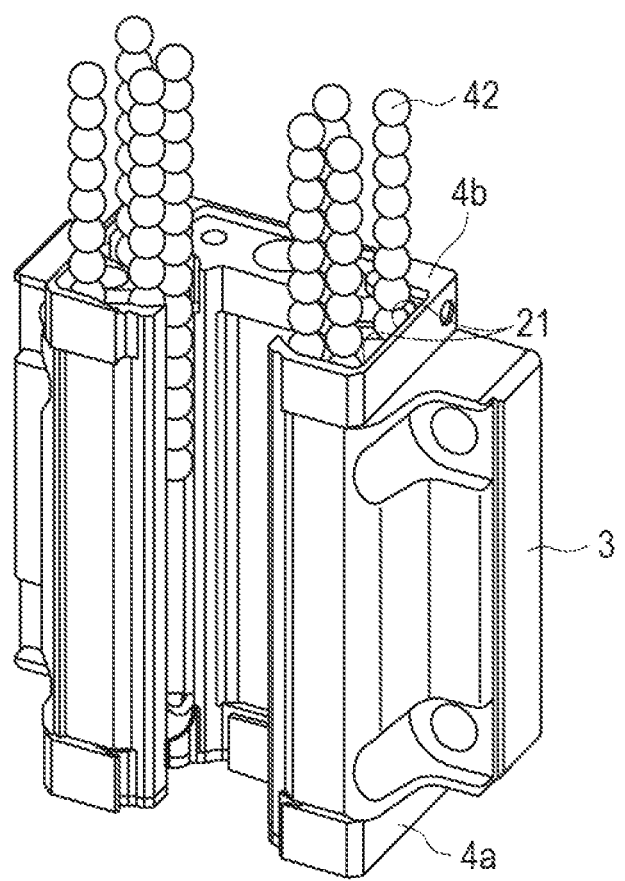
FIG. 9 is a manufacturing process diagram of the motion guide apparatus according to the first embodiment of the present invention (FIG. 9 illustrates a state where the balls are loaded into the circulation path).

Next, as illustrated in FIG. 9, balls 42 are loaded from the openings 21 in the other end plate 4b. In order to load the balls 42 in a line, the unillustrated rail jig is incorporated into the moving block body 3. The balls 42 may be loaded by an automatic machine or manually. However, it is desired to use the automatic machine for low-cost assembly. In the stage of the loading of the balls 42, the position of the end plate 4b is not determined with respect to the moving block body 3. However, the end plate 4b is integral with the end plate 4a whose position has been determined. Accordingly, it is totally possible to load the balls 42.

After the loading of the balls 42 is finished, the lid member 7b is fitted into the end plate 4b to close the openings 21 with the lid member 7b. The bosses 9 of the lid member 7b are fitted into the fitting holes 22 in the end plate 4b and the boss holes 8 in the moving block body 3 (see FIG. 7C) to determine the position of the end plate 4b in the direction orthogonal to the movement direction of the moving block body 3. Lastly, the lid member 7b and the end plate 4b are fixed to the moving block body 3 with the screws 41.

The structure and manufacturing method of the motion guide apparatus according to the embodiment has been described above. The motion guide apparatus according to the embodiment has the following effects.

The pair of end plates 4a and 4b is molded integrally with both ends of the holding portions 5. The resultant resin component 6 is incorporated into the moving block body 3 in the direction orthogonal to the movement direction of the moving block body 3. Accordingly, the positions of the pair of end plates 4a and 4b can be determined in the movement direction of the moving block body 3.

The positioning means (the bosses 9) determine the positions of the end plates 4a and 4b in the direction orthogonal to the movement direction of the moving block body 3. Accordingly, the pair of end plates 4a and 4b can be temporarily fixed to the moving block body 3. The balls 42 can be loaded from the openings 21 of the end plates 4a and 4b.

The positions of the moving block body 3, the end plates 4a and 4b, and the lid members 7a and 7b are collectively determined at the positions of the bosses 9. Accordingly, the influence of a dimensional deviation of each component can be reduced. Ease of assembly and sliding performance (that is, the movement of the balls 42) are improved.

The bosses 9 provided to the lid members 7a and 7b protrude from the opposing surfaces 18 of the end plates 4a and 4b to the moving block body 3, as in mobile bosses. Accordingly, positioning suitable for automatic assembly becomes possible.

The boss 9 provided to the lid member 7a, 7b has the through hole through which the screw 41 is passed. Accordingly, fastening at the positions of the bosses 9 becomes possible, and also the through holes of the bosses 9 can be used as the through holes for the screws 41.

The end plates 4a and 4b surround the lid members 7a and 7b in such a manner as that only the end plates 4a and 4b are visible in planar view and side view of the moving block 2. Accordingly, the height of the wall 21a of the opening 21 in the end plate 4a, 4b can be increased; accordingly, it is possible to prevent the balls 42 from dropping off the opening 21 when the balls 42 are loaded.

Figure 10:
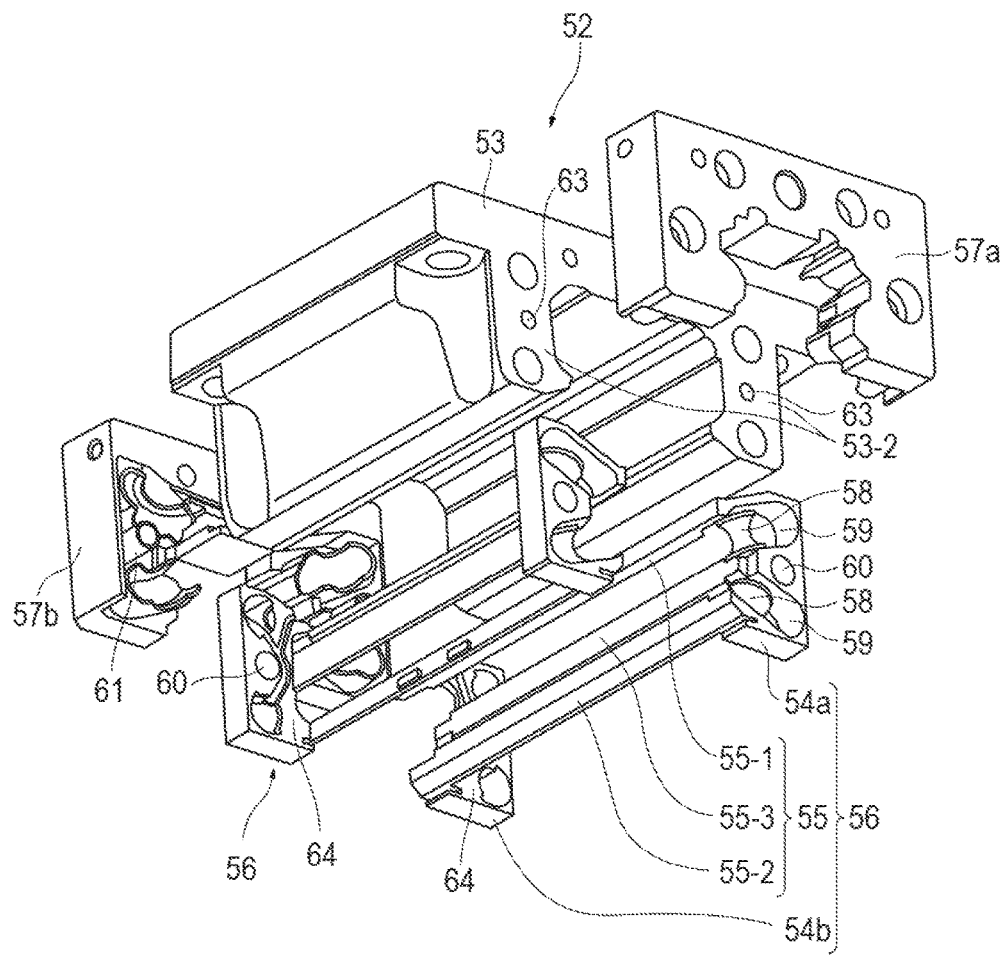
FIG. 10 is an exploded perspective view of a moving block of a motion guide apparatus according to a second embodiment of the present invention.

FIG. 10 illustrates an exploded perspective view of a moving block 52 of a motion guide apparatus according to a second embodiment of the present invention. Similarly to the moving block 2 according to the first embodiment, the moving block 52 according to the second embodiment also includes a moving block body 53, a resin component 56 obtained by molding holding portions 55 integrally with a pair of end plates 54a and 54b placed on both end surfaces in a movement direction (the front and rear direction in FIG. 10) of the moving block body 53, and a pair of lid members 57a and 57b.

The moving block 52 according to the second embodiment is different from the moving block 2 according to the first embodiment in the respect that not only upper first holding portions 55-1 and lower second holding portions 55-2 but also central third holding portions 55-3 with respect to the up and down direction are formed integrally with the resin component 56, and in the respect that the resin component 56 is divided into two: a left and a right part.

Figure 11:
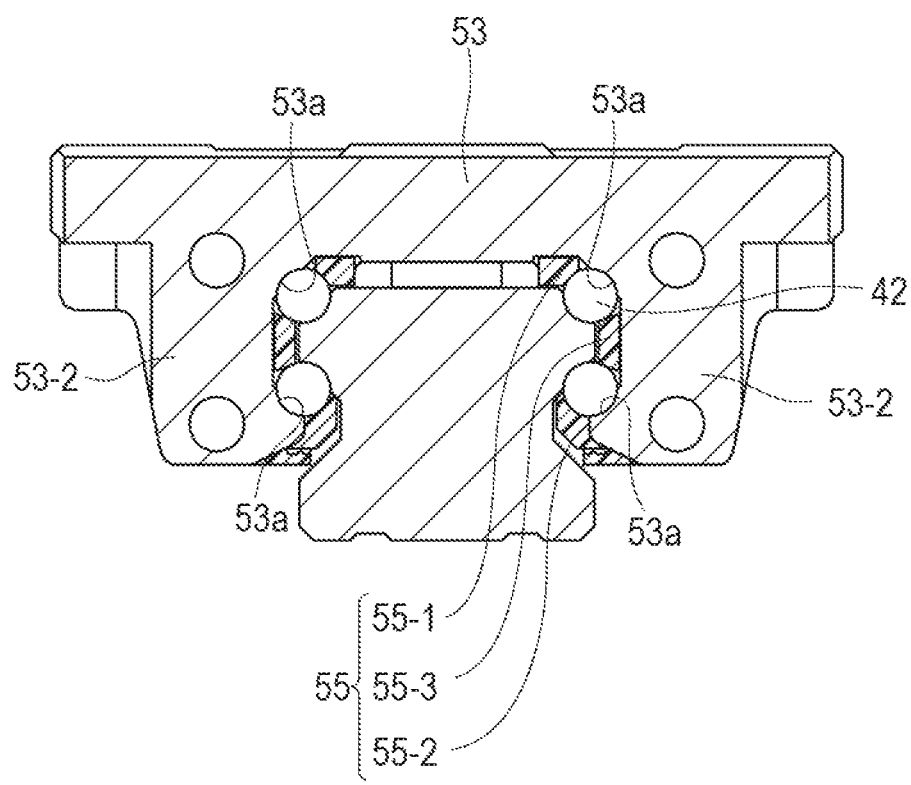
FIG. 11 is a cross-sectional view of the motion guide apparatus according to the second embodiment of the present invention, the cross-sectional view being orthogonal to a longitudinal direction of a track rail.

As illustrated in FIG. 11, upper and lower loaded ball rolling grooves 53a, a total of two, are formed in each of left and right sleeve portions 53-2 of the moving block body 53. The holding portion 55 includes the first holding portion 55-1 placed above the upper loaded ball rolling groove 53a of the moving block body 53, the third holding portion 55-3 placed between the upper and lower loaded ball rolling grooves 53a, and the second holding portion 55-2 placed below the lower loaded ball rolling groove 53a. The spacing between the first holding portion 55-1 and the third holding portion 55-3 is smaller than the diameter of the ball 42 to prevent the balls 42 from dropping off. Similarly, the spacing between the third holding portion 55-3 and the second holding portion 55-2 is smaller than the diameter of the ball 42.

Figure 12:
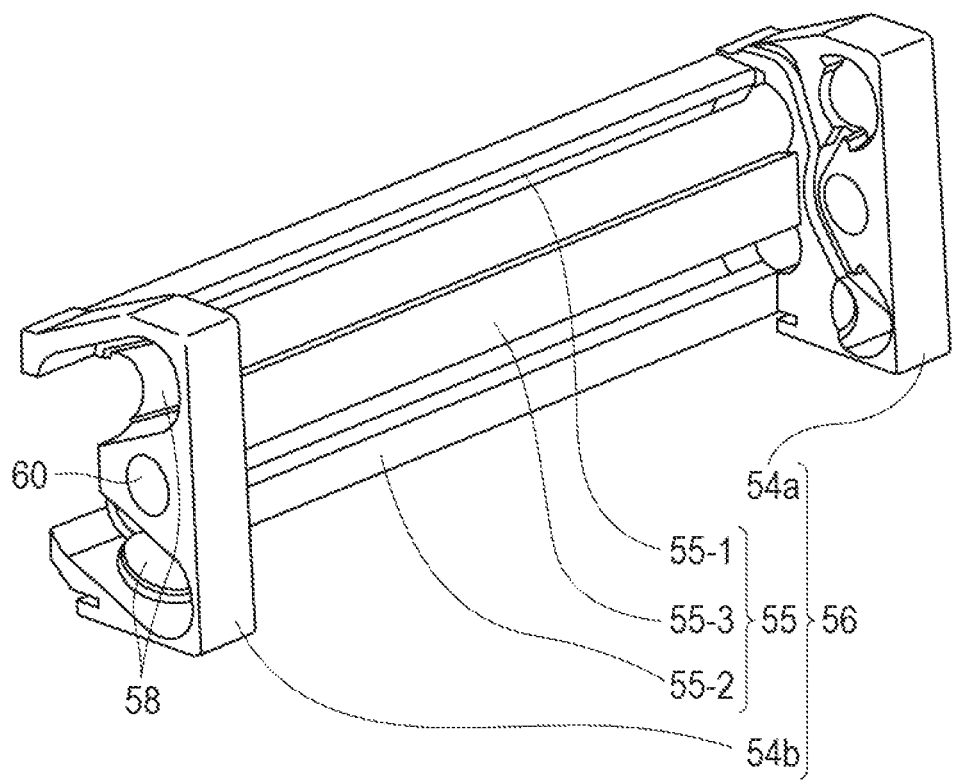
FIG. 12 is a perspective view of a resin component according to the second embodiment of the present invention.

As illustrated in FIGS. 10 and 12, the other configurations of the resin component 56 according to the second embodiment are substantially the same as those of the resin component 6 according to the first embodiment. In other words, R piece portions 58 being inner peripheral sides of direction changing paths are formed in the end plates 54a and 54b of the resin component 56. Opposing surfaces 64 of the end plates 54a and 54b to the moving block body 53 are formed in flat surfaces in such a manner as to enable incorporation of the resin component 56 in a direction orthogonal to a movement direction of the moving block body 53 from inside the pair of left and right sleeve portions 53-2 of the moving block body 53 (flat surface here indicates there is no projection protruding toward the moving block body 53, or the like, and does not indicate the elimination of the possibility of forming, in the opposing surface 64, a recess such as a groove of a lubricating path, and a hole). Openings 59 for loading the balls 42 into circulation paths are formed in the end plates 54a and 54b. Fitting holes 60 into which bosses 61 of the lid members 57a and 57b are fitted are formed in the end plates 54a and 54b.

Figure 13A:
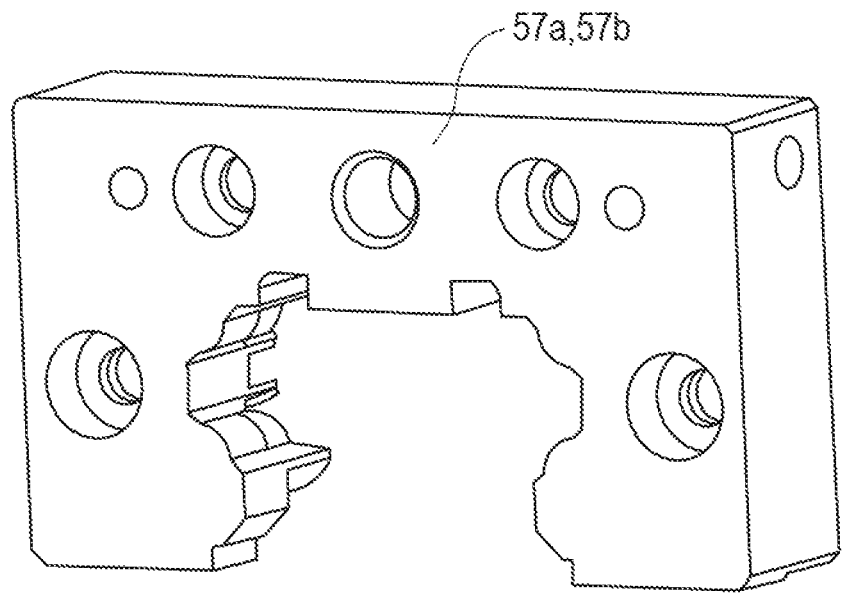
FIGS. 13A and 13B are perspective views of a lid member according to the second embodiment of the present invention (FIG. 13A illustrates a frontal perspective view, and FIG. 13B illustrates a rear perspective view).
Figure 13B:
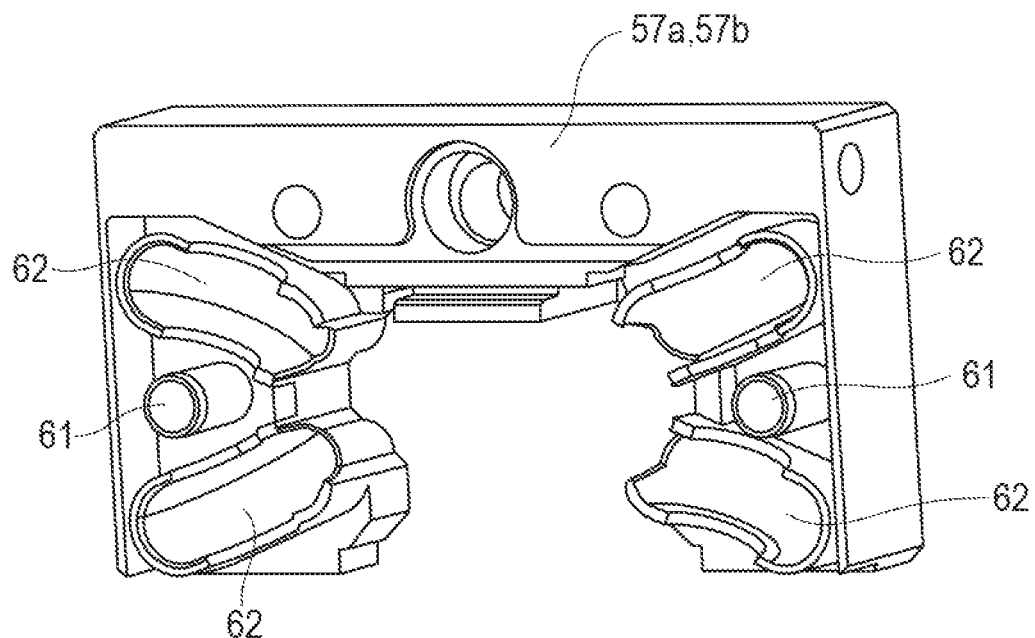

FIGS. 13A and 13B illustrate the lid member 57a, 57b according to the second embodiment. FIG. 13A illustrates a frontal perspective view. FIG. 13B illustrates a rear perspective view. As illustrated in FIG. 2, the lid members 7a and 7b are fitted into the end plates 4a and 4b in the moving block 2 according to the first embodiment. However, as illustrated in FIG. 10, the end plates 54a and 54b are fitted into the lid members 57a and 57b (in other words, the lid members 57a and 57b cover the end plates 54a and 54b) in the moving block 52 according to the second embodiment.

The other configurations of the lid members 57a and 57b according to the second embodiment are substantially the same as those of the lid members 7a and 7b according to the first embodiment. In other words, outer peripheral sides 62 of the direction changing paths are formed in the lid members 57a and 57b. For example, the cylindrical boss 61 is formed between the outer peripheral sides 62 of the upper and lower direction changing paths, protruding toward the end plate 54a, 54b. A through hole through which a screw as a fastening member is passed is formed in the boss 61. The bosses 61 of the lid members 57a and 57b are fitted into the fitting holes 60 in the end plates 54a and 54b, and further fitted into boss holes 63 (see FIG. 10) in the moving block body 53. Hence, the positions of the moving block body 53, the lid members 57a and 57b, and the resin component 56 can be collectively determined at the positions of the bosses 61 of the lid members 57a and 57b.

The motion guide apparatus according to the second embodiment of the present invention has the following effects. The first to third holding portions 55-1 to 55-3 are formed integrally with the resin component 56. Accordingly, the resin component 56 can hold the balls 42 alone, and can resist to torsion. Furthermore, the necessity to process the holding portion carrying the balls 42 in the moving block body 53 is eliminated. Accordingly, the shape of the inner side of the sleeve portion 53-2 of the moving block body 53 can be simplified. Furthermore, the resin component 56 is divided into two: the left and right parts. Accordingly, even if the lower ends of the pair of left and right sleeve portions 53-2 of the moving block body 53 extend inward, the resin component 56 can be incorporated into the moving block body 53.

Figure 14:
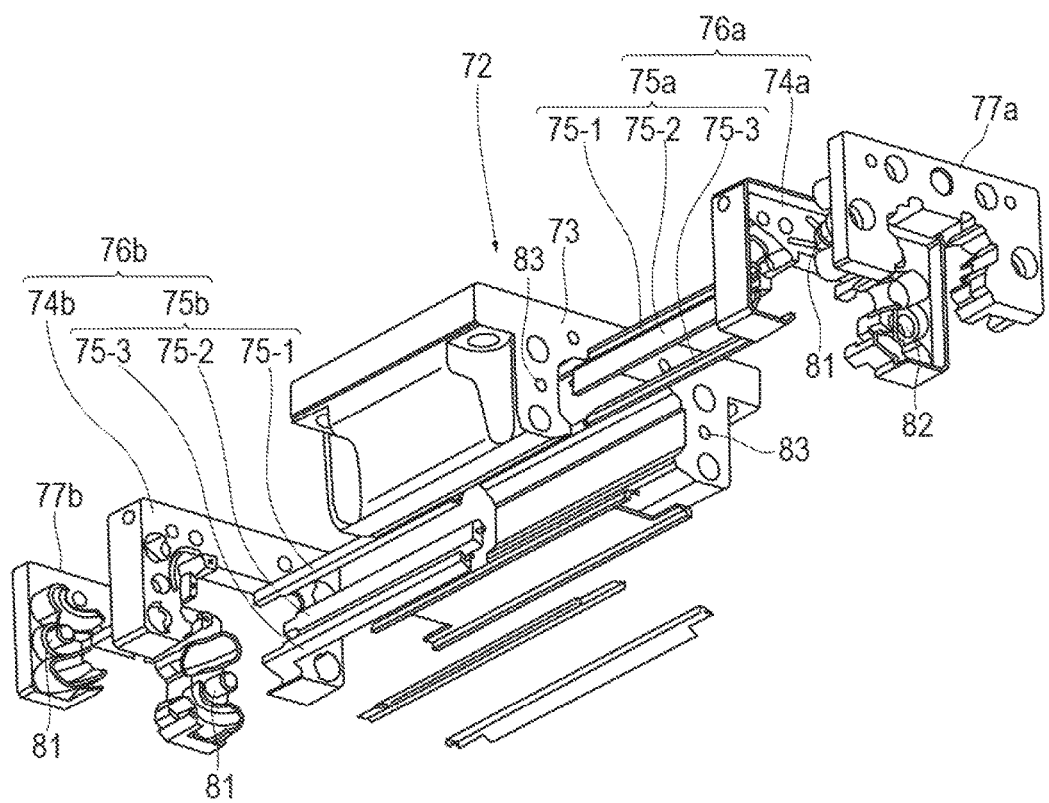
FIG. 14 is an exploded perspective view of a moving block of a motion guide apparatus according to a third embodiment of the present invention.
Figure 14:
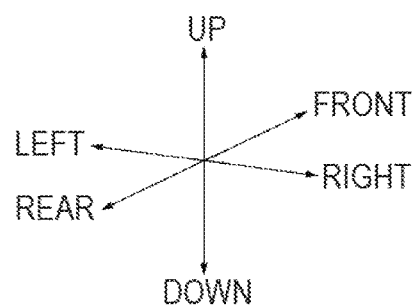

FIG. 14 illustrates an exploded perspective view of a moving block 72 according to a third embodiment of the present invention. The moving block 72 according to the third embodiment also includes a moving block body 73, resin components 76a and 76b obtained by molding holding portions 75a and 75b respectively integrally with a pair of end plates 74a and 74b placed on both end surfaces in a movement direction (the front and rear direction in FIG. 14) of the moving block body 73, and a pair of lid members 77a and 77b. The configurations of the moving block body 73 and the lid members 77a and 77b are substantially the same as those of the moving block body 53 and the lid members 57a and 57b according to the second embodiment.

The resin components 76a and 76b in the moving block 72 according to the third embodiment are different from the resin component 56 according to the second embodiment in the respect that the resin components 76a and 76b are obtained by being divided into two: a front and a rear part. In other words, a right holding portion 75a (including first to third holding portions 75-1 to 75-3) is formed integrally with an end plate 74a placed frontward of the moving block body 73. A left holding portion 75b (including first to third holding portions 75-1 to 75-3) is formed integrally with an end plate 74b placed backward of the moving block body 73.

The other configurations of the moving block 72 according to the third embodiment are substantially the same as those of the moving block 52 according to the second embodiment. In other words, fitting holes 82 into which bosses 81 of the lid members 77a and 77b are fitted are formed in the end plates 74a and 74b of the resin components 76a and 76b. Boss holes 83 into which the bosses 81 are fitted are formed in the moving block body 73.

In the moving block 72 according to the third embodiment, upon the assembly of the moving block 72, firstly the resin components 76a and 76b are incorporated from the front and the rear of the moving block body 73 toward a movement direction of the moving block body 73. After the resin components 76a and 76b are incorporated into the moving block body 73, distal ends of the holding portion 75a of the resin component 76a are fitted in the end plate 74b of the resin component 76b. Distal ends of the holding portion 75b of the resin component 76b are fitted in the end plate 74a of the resin component 76a. The fitting of the lid members 77a and 77b in the end plates 74a and 74b enables the determination of the positions of the moving block body 73, the resin components 76a and 76b, and the lid members 77a and 77b.

The present invention is not limited to concretization in the above embodiments. The present invention can be concretized in various embodiments within the scope that does not change the gist of the present invention.

In the above first embodiment, after the lid member and the end plate are fixed to the moving block body with the screws, the balls are loaded into the circulation paths. However, it is also possible to load the balls into the circulation paths in the stage where the lid member and the end plate are temporarily fixed to the moving block body before being fixed with the screws.

In the above first embodiment, the end plate is not divided into a left and a right part. However, the end plate can also be divided into a left and a right part along a cross section in the longitudinal direction of the track rail.

In the above first to third embodiments, the bosses provided to the lid members are used as the positioning means. However, bosses separated from the lid members can also be used.

In the above first to third embodiments, the return path of the circulation path comprises the through hole in the moving block body. However, the return path can also comprise a resin pipe inserted into a through hole or a resin pipe molded integrally with a through hole.

In the above first embodiment, the end plate surrounds the lid member in such a manner as that only the end plate is visible in planar view and side view of the moving block. However, the mating surface between the end plate and the lid member can also be placed on the moving block body side in such a manner as that both of the end plate and the lid member are visible.

In the above first to third embodiments, the four ball rolling grooves are formed in the track rail, and the four loaded ball rolling grooves are formed in the moving block body. However, the number of the ball rolling grooves and the loaded ball rolling grooves can also be changed as appropriate according to the applied load or the like of the motion guide apparatus.

In the above first embodiment, the holding portion includes the first and second holding portions. However, the number of the holding portions can be changed as appropriate. For example, a third holding portion can also be provided between the first and second holding portions.

In the above first to third embodiments, the example is illustrated in which the track rail is formed in a straight line. However, the track rail can also be formed in a curve. The motion guide apparatus in this case is used to guide the curvilinear motion of a mobile body.

For example, in the above first to third embodiments, the inner peripheral side of the direction changing path and the holding portion are formed integrally with the end plate of the resin component. However, it is also possible to form one of the inner peripheral side of the direction changing path and the holding portion integrally with the end plate, and incorporate the other into the end plate.

The present description is based on JP 2014-072766 A filed on Mar. 31, 2014 and JP 2015-067867 A filed on Mar. 30, 2015. Their entire contents are incorporated herein.

REFERENCE SIGNS LIST

1 Track rail (track member)
1a Ball rolling groove (rolling element rolling portion)
2 Moving block (moving member)
2a Loaded ball rolling groove (loaded rolling element rolling portion)
2b Return path
2c Direction changing path
3 Moving block body (moving member body)
3a Both end surfaces
4a, 4b End plate (end member)
5 Holding portion
6 Resin component
7a, 7b Lid member
8 Boss hole
9 Boss
16 R piece portion (an inner peripheral side of the direction changing path)
18 Opposing surface of the end plate 4a, 4b to the moving block body 3
21 Opening
22 Fitting hole
32 Direction changing path forming portion (an outer peripheral side of the direction changing path)
42 Ball (rolling element)
52 Moving block (moving member)
53 Moving block body (moving member body)
53a Loaded ball rolling groove (loaded rolling element rolling portion)
54a, 54b End plate (end member)
55 Holding portion
56 Resin component
57a, 57b Lid member
58 R piece portion (an inner peripheral side of the direction changing path)
59 Opening
60 Fitting hole
61 Boss
62 Outer peripheral side of the direction changing path
63 Boss hole
72 Moving block (moving member)
73 Moving block body (moving member body)
74a, 74b End plate (end member)
75a, 75b Holding portion
76a, 76b Resin component
77a, 77b Lid member
81 Boss
82 Fitting hole
83 Boss hole

The invention claimed is:

1. A motion guide apparatus comprising:
   a track member including a rolling element rolling portion;
   a moving member body including a loaded rolling element rolling portion facing the rolling element rolling portion, and a return path parallel to the loaded rolling element rolling portion;
   a plurality of rolling elements placed in a manner capable of rolling motion between the rolling element rolling portion of the track member and the loaded rolling element rolling portion of the moving member body;
   end members placed on end surfaces in a movement direction of the moving member body, the end members each including an inner peripheral side of a direction changing path linking the loaded rolling element rolling portion to the return path;
   a lid member including an outer peripheral side of the direction changing path; and
   a holding portion for preventing the rolling elements from dropping off the loaded rolling element rolling portion of the moving member body upon the removal of the moving member body from the track member, wherein
   at least one of a pair of the end members includes an opening, linking to the inner peripheral side of the direction changing path, for loading the rolling elements into a circulation path including the loaded rolling element rolling portion, the direction changing path, and the return path,
   opposing surfaces of the pair of the end members to the moving member body are formed in flat surfaces,
   the pair of the end members which are separate bodies from the moving member body and molded integrally with the holding portion are incorporated into the moving member body in a direction orthogonal to the movement direction of the moving member body,
   the lid member closes the opening of the end member,
   the lid member includes a boss,
   the end member includes a fitting hole into which the boss is fitted, and
   the moving member body includes a boss hole into which the boss is fitted.

2. The motion guide apparatus according to claim 1, wherein the boss of the lid member includes a through hole through which a fastening member is passed, the fastening member being tightened in the moving member body.

3. The motion guide apparatus according to claim 2, wherein the lid member is fitted into the end member, and accordingly the boss provided to the lid member protrudes from the opposing surface of the end member to the moving member body to be fitted into the boss hole provided in the moving member body.

4. The motion guide apparatus according to claim 3, wherein the lid member is surrounded by the end member in such a manner as that only the end member is visible in planar view and side view of the moving member body.

5. The motion guide apparatus according to claim 2, wherein the fastening member is tightened in the boss hole in the moving member body to attach the lid member and the end member to the moving member body.

6. The motion guide apparatus according to claim 2, wherein the lid member is surrounded by the end member in such a manner as that only the end member is visible in planar view and side view of the moving member body.

7. The motion guide apparatus according to claim 1, wherein the lid member is fitted into the end member, and accordingly a boss provided to the lid member protrudes from the opposing surface of the end member to the moving member body to be fitted into the boss hole provided in the moving member body.

8. The motion guide apparatus according to claim 7, wherein the lid member is surrounded by the end member in such a manner as that only the end member is visible in planar view and side view of the moving member body.

9. The motion guide apparatus according to claim 1, wherein the lid member is surrounded by the end member in such a manner as that only the end member is visible in planar view and side view of the moving member body.

10. A motion guide apparatus comprising:
    a track member including a rolling element rolling portion;
    a moving member body including a loaded rolling element rolling portion facing the rolling element rolling portion, and a return path parallel to the loaded rolling element rolling portion;
    a plurality of rolling elements placed in a manner capable of rolling motion between the rolling element rolling portion of the track member and the loaded rolling element rolling portion of the moving member body;
    an end member placed on an end surface in a movement direction of the moving member body; and
    a lid member including an outer peripheral side of a direction changing path linking the loaded rolling element rolling portion to the return path, wherein
    the end member is formed integrally with an inner peripheral side of the direction changing path and/or a holding portion for preventing the rolling elements from dropping off the loaded rolling element rolling portion of the moving member body upon the removal of the moving member body from the track member,
    the lid member includes a boss,
    the end member includes a fitting hole into which the boss is fitted,
    the moving member body includes a boss hole into which the boss is fitted, and
    the boss of the lid member includes a through hole through which a fastening member is passed, the fastening member being tightened in the moving member body.

11. A method for manufacturing a motion guide apparatus including a track member having a rolling element rolling portion, a moving member body having a loaded rolling element rolling portion facing the rolling element rolling portion, and a return path parallel to the loaded rolling element rolling portion, and a plurality of rolling elements placed in a manner capable of rolling motion between the rolling element rolling portion of the track member and the loaded rolling element rolling portion of the moving member body, the method comprising the steps of:
    preparing a component obtained by integrally molding a holding portion for preventing the rolling elements from dropping off the loaded rolling element rolling portion of the moving member body upon the removal of the moving member body from the track member, and a pair of end members placed on both end surfaces in a movement direction of the moving member body, the pair of end members each having an inner peripheral side of a direction changing path linking the loaded rolling element rolling portion to the return path, the pair of end members each having a flat opposing surface to the moving member body, the component being a separate body from the moving member body;

incorporating the component into the moving member body in a direction orthogonal to the movement direction of the moving member body;

loading the plurality of rolling elements from an opening in at least one of the pair of end members, the opening linking to the direction changing path, into a circulation path including the loaded rolling element rolling portion, the direction changing path, and the return path; and closing the opening in the end member with a lid member having an outer peripheral side of the direction changing path, wherein the lid member includes a boss, the end member includes a fitting hole into which the boss is fitted, and the moving member body includes a boss hole into which the boss is fitted.

* * * * *